(12) United States Patent
Rolker et al.

(10) Patent No.: US 9,221,007 B2
(45) Date of Patent: Dec. 29, 2015

(54) METHOD AND DEVICE FOR SEPARATING ACID GASES FROM A GAS MIXTURE

(71) Applicant: Evonik Degussa GmbH, Essen (DE)

(72) Inventors: Jörn Rolker, Alzenau (DE); Matthias Seiler, Griesheim (DE); Ralf Meier, Dortmund (DE); Udo Knippenberg, Marl (DE); Rolf Schneider, Gründau-Rothenbergen (DE); Muhammad Irfan, Erlensee (DE); Hari Prasad Mangalapally, Hanau (DE)

(73) Assignee: Evonik Degussa GmbH, Essen (DE)

( * ) Notice: Subject to any disclaimer, the term of this patent is extended or adjusted under 35 U.S.C. 154(b) by 271 days.

(21) Appl. No.: 13/675,979

(22) Filed: Nov. 13, 2012

(65) Prior Publication Data
US 2013/0118350 A1 May 16, 2013

Related U.S. Application Data

(60) Provisional application No. 61/560,281, filed on Nov. 15, 2011.

(30) Foreign Application Priority Data

Nov. 14, 2011 (DE) .......................... 10 2011 086 252

(51) Int. Cl.
*B01D 53/14* (2006.01)

(52) U.S. Cl.
CPC ........ *B01D 53/1475* (2013.01); *B01D 53/1425* (2013.01); *B01D 53/1456* (2013.01);
(Continued)

(58) Field of Classification Search
CPC .................. B01D 2257/504; B01D 2252/103; B01D 2252/2041; B01D 2252/20426; B01D 2252/20442; B01D 2252/2056; B01D 2252/30; B01D 53/1425; B01D 53/1456; B01D 53/1475; B01D 53/1493; F23J 2219/40; Y02C 10/04; Y02C 10/06
See application file for complete search history.

(56) References Cited

U.S. PATENT DOCUMENTS

| | | |
|---|---|---|
| 1,882,258 A | 10/1932 | Randel |
| 2,516,625 A | 7/1950 | Haury |

(Continued)

FOREIGN PATENT DOCUMENTS

| | | |
|---|---|---|
| DE | 400 488 | 8/1924 |
| DE | 633 146 | 7/1936 |

(Continued)

OTHER PUBLICATIONS

"Mutual Solubility of Water and Pyridine Derivatives" by Richard M. Stephenson, J. Chem. Eng. Data, 38, p. 428-431, 1993.*
(Continued)

*Primary Examiner* — Duane Smith
*Assistant Examiner* — Cabrena Holecek
(74) *Attorney, Agent, or Firm* — Law Office of: Michael A. Sanzo, LLC

(57) ABSTRACT

The invention is directed to a method for separating acid gases from a gas mixture in which the gas mixture is contacted with an absorption medium which comprises water and at least one amine and has a phase-separation temperature in the range from 0 to 130° C. In addition, the invention is directed to a device which can be used for carrying out this method.

14 Claims, 2 Drawing Sheets

(52) U.S. Cl.
CPC ........ *B01D53/1493* (2013.01); *B01D 2257/30* (2013.01); *B01D 2257/504* (2013.01); *F23J 2219/40* (2013.01)

(56) References Cited

U.S. PATENT DOCUMENTS

| | | | |
|---|---|---|---|
| 2,601,673 | A | 6/1952 | McMillan et al. |
| 2,802,344 | A | 8/1957 | Witherell |
| 3,276,217 | A | 10/1966 | Bourne et al. |
| 3,580,759 | A | 5/1971 | Albertson et al. |
| 3,609,087 | A | 9/1971 | Chi et al. |
| 4,094,957 | A | 6/1978 | Sartori et al. |
| 4,106,904 | A | 8/1978 | Oude Alink et al. |
| 4,152,900 | A | 5/1979 | Chopra et al. |
| 4,152,901 | A | 5/1979 | Munters |
| 4,201,721 | A | 5/1980 | Hallgren |
| 4,251,494 | A | 2/1981 | Say |
| 4,360,363 | A | 11/1982 | Ferrin et al. |
| 4,405,579 | A | 9/1983 | Sartori et al. |
| 4,405,586 | A | 9/1983 | Sartori et al. |
| 4,466,915 | A | 8/1984 | Lai |
| 4,524,587 | A | 6/1985 | Kantor |
| 4,643,000 | A | 2/1987 | Rheinfelder |
| 4,701,530 | A | 10/1987 | Swearingen et al. |
| 4,714,597 | A | 12/1987 | Trevino |
| 5,016,445 | A | 5/1991 | Wehr |
| 5,126,189 | A | 6/1992 | Tanny et al. |
| 5,186,009 | A | 2/1993 | Rockenfeller |
| 5,186,010 | A | 2/1993 | Wehr |
| 5,255,534 | A | 10/1993 | Ryan |
| 5,303,565 | A | 4/1994 | Pravda |
| 5,390,509 | A | 2/1995 | Rockenfeller et al. |
| 5,873,260 | A | 2/1999 | Linhardt et al. |
| 6,117,963 | A | 9/2000 | Boinowitz et al. |
| 6,128,917 | A | 10/2000 | Riesch et al. |
| 6,130,347 | A | 10/2000 | Julius et al. |
| 6,155,057 | A | 12/2000 | Angell et al. |
| 6,184,433 | B1 | 2/2001 | Harada et al. |
| 6,672,099 | B1 | 1/2004 | Yoshimi et al. |
| 6,680,047 | B2 | 1/2004 | Klaveness et al. |
| 6,727,015 | B1 | 4/2004 | Putter et al. |
| 7,419,646 | B2 | 9/2008 | Cadours et al. |
| 7,435,318 | B2 | 10/2008 | Arlt et al. |
| 7,827,820 | B2 | 11/2010 | Weimer et al. |
| 8,069,687 | B2 | 12/2011 | Jork et al. |
| 8,277,615 | B2 | 10/2012 | Ruffert et al. |
| 8,318,117 | B2 | 11/2012 | Lichtfers et al. |
| 8,357,344 | B2 | 1/2013 | Bouillon et al. |
| 8,362,095 | B2 | 1/2013 | Schwab et al. |
| 8,470,079 | B2 | 6/2013 | Agar et al. |
| 8,500,867 | B2 | 8/2013 | Seiler et al. |
| 8,500,892 | B2 | 8/2013 | Seiler et al. |
| 8,506,839 | B2 | 8/2013 | Shiflett et al. |
| 8,523,978 | B2 | 9/2013 | Rojey et al. |
| 8,623,123 | B2 | 1/2014 | Seiler et al. |
| 8,696,928 | B2 | 4/2014 | Seiler et al. |
| 8,715,521 | B2 | 5/2014 | Shiflett et al. |
| 8,784,537 | B2 | 7/2014 | Seiler et al. |
| 8,932,478 | B2 | 1/2015 | Seiler et al. |
| 2004/0133058 | A1 | 7/2004 | Arlt et al. |
| 2005/0070717 | A1 | 3/2005 | Wasserscheid et al. |
| 2005/0129598 | A1 | 6/2005 | Chinn |
| 2005/0202967 | A1 | 9/2005 | Hoefer et al. |
| 2005/0245769 | A1 | 11/2005 | Kohler et al. |
| 2006/0104877 | A1 | 5/2006 | Cadours et al. |
| 2006/0150665 | A1 | 7/2006 | Weimer et al. |
| 2006/0197053 | A1 | 9/2006 | Shiflett et al. |
| 2006/0251961 | A1 | 11/2006 | Olbert et al. |
| 2007/0144186 | A1 | 6/2007 | Shiflett et al. |
| 2007/0264180 | A1 | 11/2007 | Carrette et al. |
| 2007/0286783 | A1 | 12/2007 | Carrette et al. |
| 2008/0028777 | A1 | 2/2008 | Boesmann et al. |
| 2008/0283383 | A1 | 11/2008 | Ruffert et al. |
| 2009/0029121 | A1 | 1/2009 | Hammermann et al. |
| 2009/0199709 | A1* | 8/2009 | Rojey et al. ................ 95/46 |
| 2010/0011958 | A1 | 1/2010 | Cadours et al. |
| 2010/0029519 | A1 | 2/2010 | Schwab et al. |
| 2010/0084597 | A1 | 4/2010 | Schwab et al. |
| 2010/0095703 | A1 | 4/2010 | Jork et al. |
| 2010/0104490 | A1 | 4/2010 | Bouillon et al. |
| 2010/0132551 | A1* | 6/2010 | Bouillon et al. ................ 95/179 |
| 2010/0288126 | A1 | 11/2010 | Agar et al. |
| 2010/0326126 | A1 | 12/2010 | Seiler et al. |
| 2011/0000236 | A1 | 1/2011 | Seiler et al. |
| 2011/0081287 | A1 | 4/2011 | Bouillon et al. |
| 2011/0185901 | A1 | 8/2011 | Jacquin et al. |
| 2011/0256043 | A1 | 10/2011 | Blair et al. |
| 2011/0309295 | A1 | 12/2011 | Joh et al. |
| 2012/0011886 | A1 | 1/2012 | Shiflett et al. |
| 2012/0017762 | A1 | 1/2012 | Seiler et al. |
| 2012/0080644 | A1 | 4/2012 | Seiler et al. |
| 2012/0247144 | A1 | 10/2012 | Seiler et al. |
| 2012/0308458 | A1 | 12/2012 | Seiler et al. |
| 2013/0011314 | A1 | 1/2013 | Porcheron et al. |
| 2013/0023712 | A1 | 1/2013 | Porcheron et al. |
| 2013/0031930 | A1 | 2/2013 | Seiler et al. |
| 2013/0031931 | A1 | 2/2013 | Seiler et al. |
| 2013/0219949 | A1 | 8/2013 | Seiler et al. |
| 2013/0247758 | A1 | 9/2013 | Seiler et al. |
| 2013/0327084 | A1 | 12/2013 | Shiflett et al. |
| 2014/0090558 | A1 | 4/2014 | Rolker et al. |
| 2014/0105801 | A1 | 4/2014 | Rolker et al. |
| 2014/0120016 | A1 | 5/2014 | Rolker et al. |
| 2014/0356268 | A1 | 12/2014 | Schraven et al. |
| 2014/0360369 | A1 | 12/2014 | Schraven et al. |
| 2015/0125373 | A1 | 5/2015 | Willy et al. |

FOREIGN PATENT DOCUMENTS

| | | |
|---|---|---|
| DE | 36 23 680 A1 | 1/1988 |
| DE | 266 799 A1 | 4/1989 |
| DE | 195 11 709 | 10/1996 |
| DE | 103 33 546 | 2/2005 |
| DE | 10 2004 053 167 | 5/2006 |
| DE | 10 2009 000 543 | 8/2010 |
| EP | 0 033 529 A1 | 1/1981 |
| EP | 0 079 767 | 5/1983 |
| EP | 0 187 130 | 7/1986 |
| EP | 0 302 020 | 2/1989 |
| EP | 2 087 930 A1 | 8/2009 |
| EP | 2 093 278 A1 | 8/2009 |
| FR | 2 900 841 A1 | 11/2007 |
| GB | 1 306 853 | 2/1973 |
| JP | 61-129019 | 6/1986 |
| JP | 62-73055 | 4/1987 |
| JP | 1-134180 | 5/1989 |
| JP | 2-298767 | 12/1990 |
| JP | 4-268176 | 9/1992 |
| JP | 6-307730 | 11/1994 |
| JP | 7-167521 | 7/1995 |
| JP | 2001-219164 | 8/2001 |
| JP | 2002-047258 | 2/2002 |
| JP | 2004-44945 | 2/2004 |
| JP | 2006-239516 | 9/2006 |
| WO | WO 93/13367 | 7/1993 |
| WO | WO 00/61698 A1 | 10/2000 |
| WO | WO 02/074718 | 9/2002 |
| WO | WO 03/074494 | 9/2003 |
| WO | WO 2004/082809 | 9/2004 |
| WO | WO 2004/104496 | 12/2004 |
| WO | WO 2005/113702 | 12/2005 |
| WO | WO 2006/084262 | 8/2006 |
| WO | WO 2006/134015 | 12/2006 |
| WO | WO 2007/070607 | 6/2007 |
| WO | WO 2008/015217 | 2/2008 |
| WO | WO 2009/097930 | 8/2009 |
| WO | WO 2009/098155 | 8/2009 |
| WO | WO 2009/156271 | 12/2009 |
| WO | WO 2010/089257 | 8/2010 |
| WO | WO 2012/062656 | 5/2012 |
| WO | WO 2012/062830 | 5/2012 |
| WO | WO 2012/168067 | 12/2012 |
| WO | WO 2012/168094 | 12/2012 |

(56) References Cited

FOREIGN PATENT DOCUMENTS

| WO | WO 2012/168095 | 12/2012 |
|---|---|---|
| WO | WO 2013/050230 | 4/2013 |
| WO | WO 2013/050242 | 4/2013 |

OTHER PUBLICATIONS

"Review of Organic Functional Groups: Introduction to Medicinal Organic Chemistry" by Thomas L. Lemke, Lippincott Williams & Wilkins, p. 40, 2003.*
"Review of Organic Functional Groups: Introduction to Medicinal Organic Chemistry" by Thomas L. Lemke, Lippincott Williams & Wilkins, p. 39, 2003.*
Partial English language translation for JP 62-73055 listed as document B2 above and published on Apr. 3, 1987.
English language translation of JP 7-167521 published on Jul. 4, 1995. (Foreign language document submitted with English language abstract in an IDS filed on Feb. 5, 2013).
Office Action mailed Dec. 24, 2013 for co-pending U.S. Appl. No. 13/884,840.
U.S. Appl. No. 14/124,347, filed Dec. 6, 2013, Rolker.
U.S. Appl. No. 14/124,385, filed Dec. 6, 2013, Rolker.
U.S. Appl. No. 14/124,472, filed Dec. 6, 2013, Rolker.
English language abstract for EP 2 093 278 A1.
English language abstract for EP 2 087 930 A1.
English language abstract for WO 2012/062656.
Domanska, et al., Solubility of 1-Alkyl-3-ethylimidazolium-Based Ionic Liquids in Water and 1-Octanol, *J. Chem. Eng. Data* 53:1126-1132 (Apr. 2008).
Liu, et al., The physical properties of aqueous solution of room-temperature ionic liquids based on imidazolium:Database and Evaluation, *J. Mol. Liquids* 140:68-72 (Jan. 2008).
Zhou, The Vapor Surfactant Theory of Absorption and Condensation Enhancement, *Proc. Int. Sorption Heat Pump Conference*, Sep. 24-27, 2002.
English language abstract for WO 2013/050230 published on Apr. 11, 2013.
English language abstract for WO 2013/050242 published on Apr. 11, 2013.
Wasserscheid, et al., "Ionische Flüssigkeiten-neue„Lösungen für die Übergangsmetallkatalyse," *Angewandte Chemie* 112(21):3926-3945 (2000).
Wassersciieid, et al., "Ionic Liquids—New "Solutions" for Transition Metal Catalysis," *Angew. Chem. Int. Ed*. 39:3772-3789 (2000).
Ziegler, et al., "Recent developments and future prospects of sorption heat pump systems," *Int. J. Therm. Sci*. 38:191-208 (1999).
English language translation of the International Search Report for PCT/EP2012/070380 filed Oct. 15, 2012.
U.S. Appl. No. 13/883,573, filed May 5, 2013, Seiler.
U.S. Appl. No. 13/884,840, filed May 31, 2013, Seiler.
U.S. Appl. No. 13/910,014, filed Jun. 4, 2013, Seiler.
English language abstract for JP 1-134180 published on May 26, 1989.
English language abstract for JP 6-307730 published on Nov. 1, 1994.
English language abstract for JP 2001-219164 published on Aug. 14, 2001.
English language abstract for JP 2004-44945 published on Feb. 12, 2004.
English language abstract for JP 2006-239516 published on Sep. 14, 2006.
Perez-Blanco, "A Model of an Ammonia-Water Falling Film Absorber," *ASHRAE Transactions* vol. 94, pp. 467-483, 1988; (Presented at the winter meeting in Dallas Texas of the American Society of Heating, Refrigerating and Air-Conditioning Engineers, Inc(1988)).
English language translation of Office Action for Chinese application 201280028524.0 (counterpart of copending U.S. Appl. No. 14/124,472) filed in China on May 25, 2012.
U.S. Appl. No. 14/399,139, filed Nov. 5, 2014, Willy.
English language abstract for DD 266 799 A1.
English language text for DE 400 488.
English language text for DE 633 146.
English language abstract for DE 36 23 680.
English language abstract for DE 195 11 709.
English language abstract for DE 103 33 546.
English language abstract for DE 10 2004 053 167.
English language abstract for EP 0 033 529 A1.
English language abstract for FR 2 900 841.
English language abstract for JP 61-129019.
English language abstract for JP 2-298767.
English language abstract for JP 4-268176.
English language abstract for JP 7-167521.
English language abstract for WO 93/13367.
English language abstract for WO 2008/015217.
English language abstract for WO 2009/098155.
English language abstract for WO 2012/062830.
Brennecke, et al., "Ionic Liquids: Innovative Fluids for Chemical Processing," *AIChE Journal* 47(11):2384-2389 (2001).
Chua, et al., "Improved Thermodynamic Property Fields of LiBr—$H_2O$ Solution," *International Journal of Refrigeration* 23:412-429 (2000).
De Lucas, et al., "Vapor Pressures, Densities, and Viscosities of the (Water + Lithium Bromide + Lithium Formate) System and (Water + Lithium Bromide + Potassium Formate) System," *Journal of Chemical and Engineering Data, American Chemical Society*, US 48(1):18-22 (2003).
De Lucas, et al., "Absorption of Water Vapor into Working Fluids for Absorption Refrigeration Systems," *Industrial & Engineering Chemistry Research, American Chemical Society*, US 46(1):345-350 (2007).
Galán, et al., "Solvent Properties of Functionalized Ionic Liquids for $CO_2$ Absorption," *IChemE* 85(A1):31-39 (2007).
Glebov, et al., "Experimental Study of Heat Transfer Additive Influence on the Absorption Chiller Performance," *International Journal of Refrigeration* 25:538-545 (2002).
Kim, et al., "Surface tension and viscosity of 1-butyl-3-methylimidazolium iodide and 1-butyl-3-methylimidazolium tetrafluoroborate, and solubility of lithium bromide+1-butyl-3-methylimidazolium bromide in water," *Korean J. Chem. Eng*. 23(1):113-116 (2006).
Kim, et al., "Performance Evaluation of Absorption Chiller Using LiBr + $H_2N(CH_2)_2OH$ + $H_2O$, LiBr + $HO(CH_2)_3OH$ + $H_2O$, and LiBr + ($HOCH_2CH_2NH$ + $H_2O$ as Working Fluids," *Applied Thermal Engineering* 19:217-225 (1999).
Kim, et al., "Refractive Index and Heat Capacity of 1-Butyl-3-Methylimidazolium Bromide and 1-Butyl-3-Methylimidazolium Tetrafluoroborate, and Vapor Pressure of Binary Systems for 1-Butyl-3-Methylimidazolium Tetrafluoroborate-Trifluoroethanol," *Fluid Phase Equilibria* 218:215-220 (2004).
Li, et al., "Correlation and Prediction of the Solubility of $CO_2$ and $H_2S$ in an Aqueous Solution of 2-Piperidineethanol and Sulfolane," *Ind. Eng. Chem. Res*. 37:3098-3104 (1998).
Mitsubishi Heavy Industries, Ltd., "Flue Gas $CO_2$ Recovery Technology and Its Application to EOR: an Effective Strategy for Addressing the Issues of Global Warming and Peaking Oil Supply," *Technical Review*:44:20-23 (2007).
English counterpart of Mitsubishi Heavy Industries, Ltd., "Flue Gas $CO_2$ Recovery Technology and Its Application to EOR: an Effective Strategy for Addressing the Issues of Global Warming and Peaking Oil Supply," *Technical Review*:44:20-23 (2007).
Rolker, et al., "Abtrennung von Kohlendioxid aus Rauchgasen mittels Absorption," *Chemie Ingenieur Technik* 78:416-424 (2006).
Wu, et al., "Novel Ionic Liquid Thermal Storage for Solar Thermal Electric Power Systems," *Proceeding of Solar Forum. Solar Energy: The Power to Choose* Apr. 21-25, 2001.
Yoon, et al., "Cycle Analysis of Air-Cooled Absorption Chiller Using a New Working Solution," *Energy* 24:795-809 (1999).
Zhang, et al., "Screening of ionic Liquids to Capture CO2 by COSMO-RS and Experiments," *AIChE Journal* 54(10):2171-2728 (Oct. 2008).
Ziegler, et al., "Heat-Transfer Enhancement by Additives," *International Journal of Refrigeration* 19:301-309 (1996).

(56) References Cited

OTHER PUBLICATIONS

Ziegler, et al., "Multi-effect absorption chillers," *Rev. Int. Froid* 16(5):301-311 (1993).
English language translation of abstract for Rolker document.
U.S. Appl. No. 13/641,591, filed Oct. 16, 2012, Seiler.
U.S. Appl. No. 13/641,692, filed Oct. 16, 2012, Seiler.
English language abstract for DE 10 2009 000 543.
English language abstract for WO 2012/168067.
English language abstract for WO 2012/168094.
English language abstract for WO 2012/168095.
International Search Report and Written Opinion for PCT/EP2012/070380 filed Oct. 15, 2012.
Notice of Allowance for copending U.S. Appl. No. 13/884,840 mailed Mar. 13, 2014.
U.S. Appl. No. 14/372,287, filed Jul. 15, 2014, Schraven.
U.S. Appl. No. 14/373,350, filed Jul. 19, 2014, Schraven.

* cited by examiner

METHOD AND DEVICE FOR SEPARATING ACID GASES FROM A GAS MIXTURE

CROSS REFERENCE TO RELATED APPLICATIONS

The present application claims the benefit of U.S. provisional application 61/560,281, filed on Nov. 15, 2011 and priority to German Application DE 10 2011 086 252.8 filed on Nov. 14, 2011.

FIELD OF THE INVENTION

The invention relates to a method and a device for separating an acid gas, in particular $CO_2$, from a gas mixture.

BACKGROUND OF THE INVENTION

In many industrial and chemical operations there are gas streams which contain an unwanted amount of acid gases, more particularly $CO_2$, the amount of which must be reduced for further processing, for transportation or for the prevention of $CO_2$ emissions.

On the industrial scale, $CO_2$ is typically absorbed from a gas mixture by using aqueous solutions of alkanolamines as an absorption medium. The loaded absorption medium is regenerated by heating, depressurization to a lower pressure or stripping, and the carbon dioxide is desorbed. After the regeneration process, the absorption medium can be used again. These methods are described for example in Rolker, J.; Arlt, W.; "Abtrennung von Kohlendioxid aus Rauchgasen mittels Absorption" [Removal of carbon dioxide from flue gases by absorption] in Chemie Ingenieur Technik 2006, 78, pages 416 to 424, and also in Kohl, A. L.; Nielsen, R. B., "Gas Purification", 5th edition, Gulf Publishing, Houston 1997.

A disadvantage of these methods, however, is that the removal of $CO_2$ by absorption and subsequent desorption requires a relatively large amount of energy and that, on desorption, only a part of the absorbed $CO_2$ is desorbed again, with the consequence that, in a cycle of absorption and desorption, the capacity of the absorption medium is not sufficient. In addition, during a desorption by heating, a thermal and oxidative breakdown of the amine occurs on the hot heat-exchange surfaces.

WO 2008/015217 proposes to use an absorption medium, showing a phase separation into two liquid phases upon heating, for a method for separating $CO_2$ from gas mixtures in order to decrease the energy requirement for the desorption of $CO_2$. In this method the $CO_2$ is desorbed at a high $CO_2$ partial pressure and so only an insufficient capacity of the absorption medium is achieved in a cycle of absorption and desorption.

US 2009/199709 and US 2010/104490 describe methods using such an absorption medium, where the absorption medium loaded with an acid gas is heated to form two liquid phases, these phases are separated and only the acid-gas-rich liquid phase is fed to a desorption column, while the liquid phase that is low in acid gas is returned directly to the absorption. In these methods, however, some of the gas that is bound in the loaded absorption medium is already liberated in the apparatus in which the phase separation proceeds. In practice, this leads to problems, since the acid gas is generally liberated from the heavier phase and ascending gas bubbles counteract the phase separation. In addition, the method of US 2009/199709 and US 2010/104490 may not be operated stably with the devices used in US 2009/199709 and US 2010/104490, if two liquid phases are also formed in the desorption column.

U.S. Pat. No. 4,251,494 describes a method using an absorption medium which comprises water, a sterically hindered amine and an alkali metal carbonate. In this method, the composition of the absorption medium is selected in such a manner, that after the desorption the absorption medium forms two liquid phases in the evaporator of the desorption column due to evaporation of water and the temperature rise, which are separated in the evaporator and are returned to the absorber at different points. The method requires an absorption medium having a high content of alkali metal carbonate, which has an undesirably high corrosivity. In addition, just as with the use of a single-phase absorption medium, a thermal and oxidative breakdown of the amine occurs on the hot heat-exchange surfaces of the evaporator.

There is therefore still a need for a method and a device for separating acid gases from a gas mixture, in which the energy requirement is reduced by forming two liquid phases during the desorption, and which does not have the disadvantages of the methods and devices known from the prior art.

SUMMARY OF THE INVENTION

The invention therefore relates to a method for separating acid gases from a gas mixture, comprising absorption of acid gases by contacting the gas mixture in an absorber with an absorption medium that comprises water and at least one amine, obtaining a loaded absorption medium, and desorption of acid gases from the loaded absorption medium by stripping with steam in a desorption column, wherein the absorption medium used shows phase separation into two liquid phases upon heating above a phase-separation temperature in the range from 0 to 130° C. In the method according to the invention, the desorption is carried out at a temperature at which a phase separation into a water-rich liquid phase and a water-poor liquid phase proceeds in the desorption column, the resultant water-rich liquid phase and water-poor liquid phase are separated from one another, water-rich liquid phase is fed to an evaporator in which steam is generated with which acid gases are stripped in the desorption column, and water-poor liquid phase and water-rich liquid phase are returned to the absorber as absorption medium.

The invention also relates to a device for separating acid gases from a gas mixture, comprising an absorber (1), a desorption column (2) having a mass-transfer zone (3), an evaporator (5) and a phase-separation device (6) for separating two liquid phases having a feed point (7) and separate withdrawal points (8, 9) for the liquid phases. The evaporator (5) is arranged separately from the phase-separation device (6). The phase-separation device (6) comprises withdrawal points (8, 9) for a water-poor liquid phase and a water-rich liquid phase. The mass-transfer zone (3) comprises a liquid outlet (4) which is connected to the feed point (7) of the phase-separation device. The device according to the invention further comprises connecting conduits (10, 11) from the withdrawal point (8) for water-rich liquid phase to the evaporator (5) and from the withdrawal point (9) for water-poor liquid phase to the absorber (1).

DETAILED DESCRIPTION OF THE INVENTION

Figure 1:
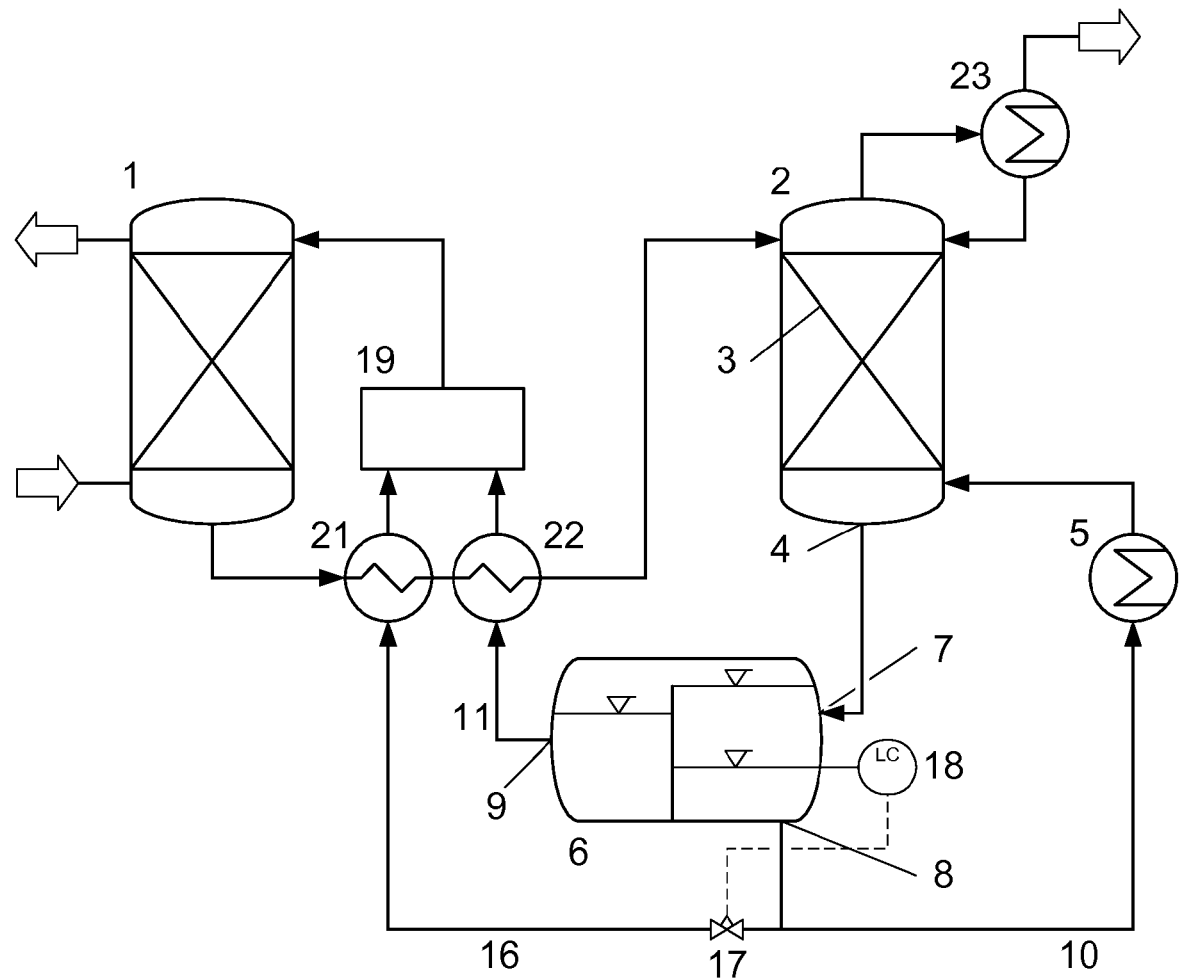
FIG. 1 shows as a flow diagram an embodiment of a device according to the invention in which the phase-separation device (6) is arranged separately from the desorption column (2).

In the method according to the invention for separating acid gases from a gas mixture, the gas mixture may be a natural gas, a methane-containing biogas from a fermentation, composting or sewage treatment plant, a combustion off-gas, an off-gas from a calcination reaction, such as the burning of lime or the production of cement, a residual gas from a blast-furnace operation for iron production or a gas mixture resulting from a chemical reaction, such as, for example, a synthesis gas comprising carbon monoxide and hydrogen, or a reaction gas from a steam-reforming hydrogen production process. The gas mixture is preferably a combustion off-gas, a natural gas or a biogas, particularly preferably a combustion off-gas, for example from a power plant.

The gas mixture contains at least one acid gas, preferably one or more acid gases from the group $CO_2$, COS, $H_2S$, $CH_3SH$ and $SO_2$, particularly preferably $CO_2$. A combustion off-gas is preferably desulphurized beforehand, i.e. $SO_2$ is removed from the gas mixture using a desulphurizing method known from the prior art, preferably by gas scrubbing with milk of lime, before the method according to the invention is carried out.

Prior to contacting with the absorption medium the gas mixture preferably has a $CO_2$ content in the range from 0.1 to 50% by volume, particularly preferably in the range from 1 to 20% by volume, most preferably in the range from 10 to 20% by volume.

The gas mixture may further contain oxygen in addition to acid gases, preferably at a fraction of 0.1 to 25% by volume, and particularly preferably at a fraction of 0.1 to 10% by volume.

In the method according to the invention, the gas mixture is contacted in an absorber with an absorption medium which comprises water and at least one amine and which on heating to above a phase-separation temperature, which is in the range from 0 to 130° C., shows a phase separation into two liquid phases. The phase separation temperature relates in this case to the non-loaded absorption medium without acid gases. Amines, for which mixtures with water have a phase-separation temperature in the range from 0 to 130° C., are known to those skilled in the art from the prior art, for example from WO 2008/015217, US 2009/199709 and US 2010/104490. Preferably, amines are used which, at 100° C., have a solubility of less than 100 g of amine in 1 l of water, particularly preferably less than 60 g of amine in 1 l of water, and most preferably less than 10 g of amine in 1 l of water.

The content of alkali metal salts in the absorption medium is preferably less than 10% by weight, particularly preferably less than 5% by weight, and in particular less than 2% by weight.

In a preferred embodiment, the absorption medium comprises at least one amine of formula (I)

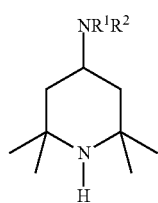

(I)

wherein the radicals $R^1$ and $R^2$ independently of one another are hydrogen or aliphatic radicals having 1 to 10 carbon atoms that can be substituted with amino groups or alkyl amino groups.

In a further preferred embodiment, the absorption medium comprises at least one amine of formula (I) for which the radicals $R^1$ and $R^2$ independently of one another are hydrogen or alkyl radicals having 1 to 6 carbon atoms, wherein, particularly preferably, $R^1$ is hydrogen and $R^2$ is an alkyl radical having 1 to 6 carbon atoms. Most preference is given to the compounds 4-(n-propylamino)-2,2,6,6-tetramethylpiperidine and 4-(n-butylamino)-2,2,6,6-tetramethylpiperidine, for which $R^1$ is hydrogen and $R^2$ is n-propyl or n-butyl.

In a particularly preferred embodiment, the absorption medium comprises a first amine of formula (I), for which the radicals $R^1$ and $R^2$ independently of one another are hydrogen or alkyl radicals having 1 to 6 carbon atoms, and a second amine of formula (I), for which $R^1$ is hydrogen and $R^2$ is a radical $(CH_2)_n NR^3R^4$ where n=2 to 4, $R^3$=hydrogen or alkyl radical having 1 to 4 carbon atoms, and $R^4$=alkyl radical having 1 to 4 carbon atoms. For the first amine of formula (I), $R^1$ is preferably hydrogen and $R^2$ an alkyl radical having 1 to 6 carbon atoms, wherein $R^2$ particularly preferably is n-propyl or n-butyl. The second amine of formula (I) is preferably 4-(3-dimethylaminopropylamino)-2,2,6,6-tetramethylpiperidine, for which n=3 and $R^3$, $R^4$=methyl, or 4-(2-ethylaminoethylamino)-2,2,6,6-tetramethylpiperidine, for which n=2, $R^3$=methyl and $R^4$=hydrogen. The weight ratio of first amine of formula (I) to second amine of formula (I) is then preferably in the range from 10:1 to 1:10, particularly preferably in the range from 3:1 to 1:5, and in particular in the range from 1:1 to 1:3.

Preferably, the absorption medium comprises 25 to 85% by weight water and 15 to 75% by weight amines of formula (I), in each case based on non-loaded absorption medium without acid gases.

By using an absorption medium which contains amines of the formula (I), a high capacity for the absorption of $CO_2$ may be achieved, even in the case of low $CO_2$ partial pressure. Furthermore, such absorption media are of low corrosivity, show a good stability towards oxidative and thermal breakdown and do not show foam formation in the method according to the invention.

In addition to water and amines of formula (I), the absorption medium may further contain at least one sterically unhindered primary or secondary amine as activator. A sterically unhindered primary amine in the context of the invention is a primary amine in which the amino group is bound to a carbon atom to which at least one hydrogen atom is bound. A sterically unhindered secondary amine in the context of the invention is a secondary amine in which the amino group is bound to carbon atoms to which in each case at least two hydrogen atoms are bound. The content of sterically unhindered primary or secondary amines is preferably 0.1 to 10% by weight, particularly preferably 0.5 to 8% by weight. Activators known from the prior art, such as, for example, ethanolamine, piperazine and 3-(methylamino)propylamine, are suitable as activators. 4-Amino-2,2,6,6-tetramethylpiperidine is also suitable. The addition of an activator leads to an acceleration of the absorption of $CO_2$ from the gas mixture without losing absorption capacity.

In addition to water and amines, the absorption medium may further contain one or more physical solvents. The fraction of physical solvents can be up to 50% by weight. Suitable physical solvents are sulfolane, aliphatic acid amides, such as N-formylmorpholine, N-acetylmorpholine, N-alkyl-pyrrolidones, in particular N-methyl-2-pyrrolidone, or N-alkylpiperidones, and also diethylene glycol, triethylene glycol and polyethylene glycols and alkyl ethers thereof, in particular diethylene glycol monobutyl ether. Preferably, however, the absorption medium does not contain a physical solvent.

The absorption medium may additionally comprise further additives, such as corrosion inhibitors, wetting-promoting additives and defoamers.

All compounds known to the skilled person as suitable corrosion inhibitors for the absorption of $CO_2$ using alkanolamines can be used as corrosion inhibitors in the absorption medium of the invention, in particular the corrosion inhibitors described in U.S. Pat. No. 4,714,597. When amines of formula (I) are used, a significantly lower amount of corrosion inhibitors can be chosen than in the case of a customary absorption medium comprising ethanolamine, since absorption media containing amines of formula (I) are significantly less corrosive towards metallic materials than the customarily used absorption media that contain ethanolamine The nonionic surfactants, zwitterionic surfactants and cationic surfactants known from WO 2010/089257, page 11, line 18 to page 13, line 7 are preferably used as wetting-promoting additive.

All compounds known to the skilled person as suitable defoamers for the absorption of $CO_2$ using alkanolamines can be used as defoamers in the absorption medium.

The gas mixture is preferably contacted with the absorption medium in an absorption column, wherein the absorption column is preferably operated in countercurrent flow, in order to achieve a low residual content of acid gases in the gas mixture after the absorption.

The absorption is preferably carried out at a temperature in the range from 0° C. to 70° C., particularly preferably 20° C. to 50° C., wherein the temperature of the absorption medium on entry into the absorber is below the phase-separation temperature. Within the absorber, the temperature may also increase above the phase-separation temperature if, owing to the absorption of acid gas into the absorption medium, salts are formed from the amine which have a higher water solubility than the amine. When an absorption column operated in countercurrent flow is used, the temperature of the absorption medium is preferably 30 to 60° C. on entry into the column and 35 to 70° C. on exit from the column.

The absorption is preferably carried out at a pressure of the gas mixture in the range from 0.8 to 50 bar, particularly preferably 0.9 to 30 bar. During separation of $CO_2$, the initial partial pressure of $CO_2$ in the gas mixture is preferably 0.01 to 4 bar, particularly preferably 0.05 to 3 bar. In a particularly preferred embodiment, the absorption is carried out at a total pressure of the gas mixture in the range from 0.8 to 1.5 bar, in particular 0.9 to 1.1 bar. This particularly preferred embodiment is recommendable for the absorption of $CO_2$ from the combustion exhaust gas of a power plant without compression of the combustion exhaust gas.

In the method according to the invention, the loaded absorption medium obtained in the absorber is fed to a desorption column in which acid gases are desorbed from the loaded absorption medium by stripping with steam. The desorption is carried out at a temperature at which a phase separation into a water-rich liquid phase and a water-poor liquid phase occurs in the desorption column. The temperature in the desorption is preferably in the range from 50° C. to 200° C., particularly preferably in the range from 80° C. to 150° C. The desorption is preferably carried out at a pressure in the range from 10 mbar to 10 bar, particularly preferably in the range from 100 mbar to 5 bar.

The water-rich liquid phase and the water-poor liquid phase resulting in the desorption are separated from one another. Part of the water-rich liquid phase is fed to an evaporator in which steam is generated which is fed into the desorption column and by which acid gases are stripped in the desorption column. The water-poor liquid phase and the remaining part of the water-rich liquid phase are returned to the absorber as absorption medium. In doing so, the water-poor liquid phase and the remaining part of the water-rich liquid phase are preferably mixed with one another at a temperature below the phase-separation temperature before they are returned to the absorber. The fraction of water-rich liquid phase that is not vaporized in the evaporator can alternatively be fed to the desorption column or to the absorber.

With the method according to the invention, a high capacity of the absorption medium can be achieved in a cycle of absorption and desorption, since in the method the desorption can be carried out to a low residual content of acid gases and absorption media having a high weight fraction of amines can be used, with which a high loading on absorption is achieved. The thermal and oxidative breakdown of the amines used for the absorption is low in the method according to the invention, since only a small fraction of the amines passes into the evaporator and is exposed there to the high temperatures on the heat-exchange surfaces. The energy requirement of the method according to the invention is markedly lower compared with methods which use a single-phase absorption medium. The method according to the invention does not require any auxiliaries in addition to water and amine and can be carried out in simple and cost-effective apparatuses.

Figure 2:
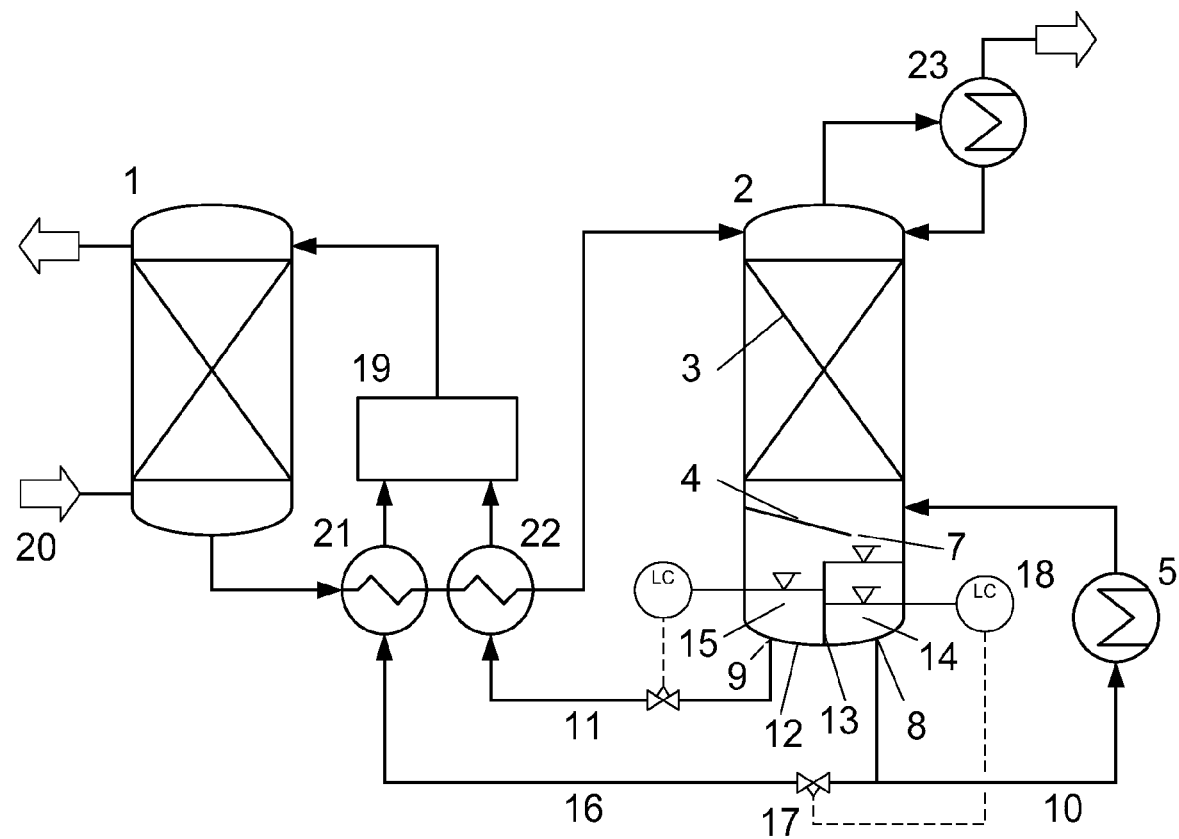
FIG. 2 shows as a flow diagram a preferred embodiment of a device according to the invention in which the phase-separation device (6) is arranged within the desorption column (2) below the mass-transfer zone (3).

FIGS. 1 and 2 illustrate devices according to the invention. The device according to the invention for separating acid gases from a gas mixture comprises an absorber (1) in which the gas mixture (20) containing the acid gases is contacted with a liquid absorption medium. All apparatus known from the prior art for absorbing a gas from a gas mixture into a liquid can be used as absorber. Preferably, a scrubbing column is used as absorber, which scrubbing column preferably comprises internals for enlarging the phase boundary between the gas mixture and the liquid absorption medium. Suitable internals are, for example, packing elements, e.g. Raschig rings or Pall rings, structured column packings, e.g. metal sheet packings, and also column trays, e.g. sieve trays. Alternatively, a membrane contacter, a radial flow scrubber, a jet scrubber, a Venturi scrubber or a rotary spray scrubber can be used as absorber. Particularly preferably, a scrubbing column for counter-current flow operation is used as absorber, in which the gas mixture containing the acid gases is fed to a lower region of the scrubbing column and the liquid absorption medium is fed to an upper region of the scrubbing column.

The device according to the invention comprises a desorption column (2) having a mass-transfer zone (3) which is arranged within the desorption column. Absorption medium which is loaded with the acid gas is fed to the desorption column from the absorber. Preferably, the absorption medium loaded with the acid gas is fed to the desorption column above the mass-transfer zone. All columns known from the prior art for desorption of a gas from a liquid can be used as desorption column. The mass-transfer zone (3) is preferably designed in the form of internals which effect an enlargement of the surface area. Preferably column trays, random packings or structured packings are used as internals. Suitable column trays are, for example, bubble-cap trays, sieve trays, tunnel trays, valve trays, slotted trays, slotted sieve trays, bubble-cap sieve trays, nozzle trays or centrifugal trays. Suitable random packings are, for example, Raschig rings, Lessing rings, Pall rings, Berl saddles or Intalox saddles. Suitable structured packings are, for example, the Mellapak column packings from Sulzer, the Rombopak type from Kuhni or the Montz-Pak type from Montz. In the mass-transfer zone, sections having column trays, random packings and structured packings may be combined as desired. The mass-transfer zone (3) comprises a liquid outlet (4) at which liquid is collected which exits from the lower end of the mass-transfer zone.

The device according to the invention comprises an evaporator (5) in which steam is generated which is fed to the desorption column (2) in order to supply heat for the desorption of acid gas from the loaded absorption medium and to separate off acid gases from the liquid absorption medium with the steam stream. All evaporators known from the prior art can be used as evaporators, for example natural circulation evaporators, forced-circulation evaporators, falling-film evaporators or thin-film evaporators.

The device according to the invention comprises a phase-separation device (6) for separating two liquid phases having a feed point (7) and separate withdrawal points (8, 9) for the liquid phases, a withdrawal point (8) for water-rich liquid phase and a withdrawal point (9) for water-poor liquid phase. The evaporator (5) and the phase-separation device (6) are arranged separately from one another. The liquid outlet (4) of the mass-transfer zone (3) is connected to the feed point (7) of the phase-separation device in order to feed liquid leaving the mass-transfer zone to the phase-separation device. All apparatuses known from the prior art for separating mixtures of two liquid phases can be used as phase-separation device. Suitable apparatuses are, for example, settlers in which the phases separate due to gravity. Alternatively, separators can be used in which the phases separate by centrifugal forces. In a preferred embodiment, the phase-separation device (6) is arranged within the desorption column (2) below the mass-transfer zone (3).

The device according to the invention comprises a connecting conduit (10) from the withdrawal point (8) for water-rich liquid phase to the evaporator (5), feeding water-rich liquid phase to the evaporator in order to generate steam therefrom. The device according to the invention additionally comprises a connecting conduit (11) from the withdrawal point (9) for water-poor liquid phase to the absorber (1), returning water-poor liquid phase to the absorber. Preferably, the device according to the invention additionally comprises a connecting conduit (16) from the withdrawal point (8) for water-rich liquid phase to the absorber (1), returning water-rich liquid phase to the absorber.

In a preferred embodiment, the device according to the invention additionally comprises a connecting conduit (16) between the withdrawal point (8) for water-rich liquid phase and the absorber (1), wherein a control valve (17) or a controllable pump is arranged in the connecting conduit. In this embodiment, the phase-separation device (6) comprises a level controller (18) for a liquid-liquid phase boundary in the phase-separation device (6), which controls the control valve (17) or the controllable pump. Alternatively, the connecting conduit (16) can also be connected to an additional withdrawal point for water-rich liquid phase in the phase-separation device (6) which is separate from the withdrawal point (8) which is connected to the evaporator (5). The amount of water-rich liquid phase which is returned to the absorber may be controlled with such a level controller in such a manner that no water has to be fed additionally to the absorber for steady-state operation of the device.

In a further preferred embodiment, the device according to the invention additionally comprises a mixing device (19) which is arranged in the connecting conduit (11) from the withdrawal point (9) for water-poor liquid phase to the absorber (1) and which is connected to the withdrawal point (8) for water-rich liquid phase and mixes liquid from the withdrawal point (9) for water-poor liquid phase with liquid from the withdrawal point (8) for water-rich liquid phase. All devices known to those skilled in the art for mixing two liquids can be used as mixing device. Suitable mixing devices are, for example, stirred tanks, tanks having a liquid recirculation via an external circuit, or static mixers. Preference is given to vessels having a liquid recirculation via an external circuit and a feed of water-poor liquid phase and water-rich liquid phase into the external circuit. Preferably, heat exchangers (21, 22) are arranged in the conduits via which water-poor liquid phase and water-rich liquid phase is fed to the mixing device (19), with which heat exchangers the two phases may be cooled to a temperature below the phase-separation temperature of the absorption medium used in the absorber. Particularly preferably, the heat exchangers (21, 22) are arranged in such a manner that they effect a heat exchange between the loaded absorption medium which is fed from the absorber (1) to the desorption column (2) and the liquid phases which are fed to the mixing device (19). Use of the mixing device ensures a uniform composition of the absorption medium in the absorber when operating the device and safeguards that variations in the control of the device do not affect the efficacy of the absorption.

The device according to the invention preferably additionally comprises a condenser (23) which is connected to the top of the desorption column (2) and by which water leaving the desorption column in the vapour state together with the desorbed acid gas is condensed and returned to the desorption column.

FIG. 1 shows an embodiment of the device according to the invention in which the phase-separation device (6) is arranged separately from the desorption column (2) and is designed as a settler having an overflow weir. In this embodiment, the bottom outlet of the desorption column is used as liquid outlet (4) of the mass-transfer zone (3). Coalescence-promoting internals, such as coalescence filters, can be arranged in the connecting conduit between the liquid outlet (4) and the feed point (7) of the phase-separation device in order to achieve a more complete phase separation in the phase-separation device.

FIG. 2 shows a preferred embodiment of the device according to the invention in which the phase-separation device (6) is arranged within the desorption column (2) below the mass-transfer zone (3). The phase-separation device (6) in this case is formed by an overflow weir (13) in the column bottom (12) which separates the column bottom into a first zone (14) and a second zone (15), and also by a feed point (7) to the first zone (14), wherein the feed point is connected to the liquid outlet (4) of the mass-transfer zone (3). The liquid outlet (4) in this case is preferably constructed as a collecting tray for liquid having a liquid outlet above the first zone. The feed point for the first zone (14) can be arranged above the first zone (14), as shown in FIG. 2, or be arranged within the first zone (14) below the upper edge of the overflow weir (13). As shown in FIG. 2, for use with absorption media in which the water-poor phase is lighter than the water-rich phase a withdrawal point (8) is arranged in the first zone (14), which withdrawal point is connected to the evaporator (5) via a connecting conduit (10) and a withdrawal point (9) is arranged in the second zone (15), which withdrawal point (9) is connected to the absorber (1) via a connecting conduit (11). For use with absorption media in which the water-poor phase is heavier than the water-rich phase, the withdrawal points (8) and (9) are exchanged compared with FIG. 2.

The device according to the invention may comprise additional pumps, measuring devices, control fittings, shutoff fittings and buffer tanks which are not shown in FIGS. 1 and 2 and which those skilled in the art can add to the above-described operation of the device in accordance with their general knowledge.

The device according to the invention is of a simple structure and can be constructed using commercially available apparatuses. It makes possible stable operation without fluctuations in the separation performance for acid gases even when absorption media are used which exhibit phase-separation in the desorption column into two liquid phases of which one phase is water-poor, such that no steam can be generated in the evaporator from this phase. When such absorption media are used in the devices known from US 2009/199709, US 2010/104490 and U.S. Pat. No. 4,251,494, in contrast, severe fluctuations occur in steam generation in the evaporator, which lead to unstable operation. Since in the device according to the invention only the water-rich liquid phase, which contains a low fraction of amines, comes into contact with the hot heat-exchange surfaces of the evaporator, only a low thermal and oxidative breakdown of the amines used in the absorption medium occurs during operation.

The examples below illustrate the invention, without, however, restricting the subject matter of the invention.

EXAMPLES

Table 1 shows compositions of absorption media suitable for the method according to the invention and the phase-separation temperatures of these absorption media (loaded with $CO_2$ and without loading).

For determining the phase-separation temperature of $CO_2$-loaded absorption medium, the absorption medium was placed in a pressure-rated glass vessel and saturated with $CO_2$ by adding dry ice at 20° C. and atmospheric pressure. The glass vessel was then sealed and the $CO_2$-loaded absorption medium was slowly heated in an oil bath until separation into two liquid phases occurred, which was recognizable as turbidity of the previously clear mixture.

Abbreviations in Table 1:
Propyl-TAD: 4-(n-Propylamino)-2,2,6,6-tetramethylpiperidine
Butyl-TAD: 4-(n-Butylamino)-2,2,6,6-tetramethylpiperidine
DM-TAD: 4-(Dimethylamino)-2,2,6,6-tetramethylpiperidine
TAT: 4-(3-Dimethylaminopropylamino)-2,2,6,6-tetramethylpiperidine, or triacetonetriamine
EAE-TAD: 4-(2-Ethylaminoethylamino)-2,2,6,6-tetramethylpiperidine
MEA: Ethanolamine
DEA: Diethanolamine
MDEA: Methyldiethanolamine
AMP: 2-Amino-2-methyl-1-propanol
n.d.: not determined

TABLE 1

| Component in % by weight | Example | | | | | | | |
|---|---|---|---|---|---|---|---|---|
| | 1 | 2 | 3 | 4 | 5 | 6 | 7 | 8 |
| Water | 70 | 70 | 70 | 70 | 70 | 70 | 70 | 70 |
| Propyl-TAD | 30 | 20 | 10 | 10 | 10 | 10 | 0 | 0 |
| Butyl-TAD | 0 | 10 | 0 | 0 | 0 | 0 | 30 | 10 |
| DM-TAD | 0 | 0 | 0 | 0 | 0 | 0 | 0 | 0 |
| TAT | 0 | 0 | 20 | 0 | 0 | 0 | 0 | 20 |
| DEA | 0 | 0 | 0 | 20 | 0 | 0 | 0 | 0 |
| MDEA | 0 | 0 | 0 | 0 | 20 | 0 | 0 | 0 |
| AMP | 0 | 0 | 0 | 0 | 0 | 20 | 0 | 0 |
| Phase-separation temperature non-loaded | 70° C. | 45° C. | 95° C. | 105° C. | 100° C. | 100° C. | 45° C. | 70° C. |
| Phase-separation temperature loaded with $CO_2$ | 110° C. | 98° C. | 115° C. | >120° C. | >110° C. | >110° C. | 90° C. | 107° C. |

| Component in % by weight | Example | | | | | | | |
|---|---|---|---|---|---|---|---|---|
| | 9 | 10 | 11 | 12 | 13 | 14 | 15 | 16 |
| Water | 70 | 70 | 70 | 70 | 70 | 70 | 70 | 85 |
| Butyl-TAD | 10 | 10 | 10 | 10 | 0 | 0 | 0 | 15 |
| DM-TAD | 0 | 0 | 0 | 0 | 30 | 0 | 0 | 0 |
| TAT | 0 | 0 | 0 | 0 | 0 | 30 | 0 | 0 |
| EAE-TAD | 0 | 0 | 0 | 0 | 0 | 0 | 30 | 0 |
| MEA | 20 | 0 | 0 | 0 | 0 | 0 | 0 | 0 |
| DEA | 0 | 20 | 0 | 0 | 0 | 0 | 0 | 0 |
| MDEA | 0 | 0 | 20 | 0 | 0 | 0 | 0 | 0 |
| AMP | 0 | 0 | 0 | 20 | 0 | 0 | 0 | 0 |
| Phase-separation temperature non-loaded | 82° C. | 85° C. | 75° C. | 95° C. | 90° C. | 110° C. | 115° C. | n.d. |
| Phase-separation temperature loaded with $CO_2$ | >125° C. | >125° C. | >125° C. | 112° C. | 90° C. | >130° C. | >120° C. | 116° C. |

| Component in % by weight | Example | | | | | | |
|---|---|---|---|---|---|---|---|
| | 17 | 18 | 19 | 20 | 21 | 22 | 23 |
| Water | 55 | 40 | 10 | 85 | 55 | 40 | 25 |
| Butyl-TAD | 45 | 60 | 90 | 5 | 15 | 20 | 25 |
| TAT | 0 | 0 | 0 | 10 | 30 | 40 | 50 |
| Phase-separation temperature non-loaded | n.d. | n.d. | n.d. | n.d. | n.d | n.d. | n.d. |
| Phase-separation temperature loaded with $CO_2$ | 107° C. | 105° C. | 115° C. | 125° C. | 110° C. | 105° C. | 110° C. |

For a mixture of water and 4-(n-butylamino)-2,2,6,6-tetramethylpiperidine (butyl-TAD), the composition of the two liquid phases in the two-phase region was determined in dependence on the temperature. The results given in Table 2 show that the water-rich liquid phase, which is fed to the evaporator in the method according to the invention, contains only low fractions of amine.

TABLE 2

| Temperature in ° C. | Water fraction upper phase in % by weight | Water fraction lower phase in % by weight |
| --- | --- | --- |
| 60 | 17.5 | 98.3 |
| 67 | 12.5 | 98.9 |
| 75 | 9.3 | 99.2 |
| 82 | 6.8 | 99.3 |
| 93 | 4.5 | 99.4 |

What is claimed is:

1. A method for separating acid gases from a gas mixture, said method comprising:
 a) absorbing acid gases by contacting the gas mixture with an absorption medium comprising water and at least one amine to obtain a loaded absorption medium, wherein absorption takes place in an absorber and the absorption medium:
  i) shows phase separation into two liquid phases upon heating above a phase-separation temperature in the range of 0 to 130° C.;
  ii) comprises at least one amine of formula (I):

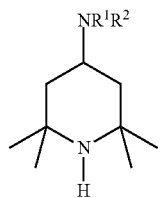

(I)

wherein $R^1$ is hydrogen and $R^2$ is an alkyl radical having 1to 6 carbon atoms;
 b) desorbing acid gases from the loaded absorption medium by stripping the loaded absorption medium with steam in a desorption column, wherein desorption is carried out at a temperature at which a phase separation into a water-rich liquid phase and a water-poor liquid phase occurs in the desorption column;
 c) separating the water-rich liquid phase and water-poor liquid phase from one another;
 d) feeding the water-rich liquid phase to an evaporator in which steam is generated with which acid gases are stripped in the desorption column; and
 e) returning the water-poor liquid phase and water-rich liquid phase to the absorber as absorption medium.

2. The method of claim 1, wherein the absorption medium comprises an amine that, at 100° C., has a solubility of less than 100 g of amine in 1 l of water.

3. The method of claim 1, wherein $R^2$ the absorption medium comprises 25 to 85% by weight water and 15 to 75% by weight amines of formula (I).

4. The method of claim 1, wherein the absorption medium comprises:
 a) a first amine of formula (I), wherein $R^1$ is hydrogen and $R^2$ is an alkyl radical having 1 to 6 carbon atoms; and
 b) a second amine of formula (I), for which $R^1$ is hydrogen and $R^2$ is a radical $(CH_2)_n NR^3 R^4$, where n=2 to 4, $R^3$=hydrogen or alkyl radical having 1 to 4 carbon atoms, and $R^4$=alkyl radical having 1 to 4 carbon atoms.

5. The method of claim 1, wherein the absorption medium comprises 25 to 85% by weight water and 15 to 75% by weight amines of formula (I).

6. The method of claim 4, wherein the absorption medium comprises 25 to 85% by weight water and 15 to 75% by weight amines of formula (I).

7. The method of claim 6, wherein, in said second amine of formula (I), $R^1$ is hydrogen and $R^2$ is a radical $(CH_2)_n NR^3 R^4$, where n=2 to 4, $R^3$=hydrogen, and $R^4$=alkyl radical having 1 to 4 carbon atoms.

8. The method of claim 6, wherein in said second amine of formula (I), $R^1$ is hydrogen and $R^2$ is a radical $(CH_2)_n NR^3 R^4$ where n=2 to 4, $R^3$=alkyl radical having 1 to 4 carbon atoms, and $R^4$=alkyl radical having 1 to 4 carbon atoms.

9. The method of claim 1, wherein absorption is carried out at a temperature in the range of 0° C. to 70° C., and the temperature of the absorption medium on entry into the absorber is below the phase-separation temperature.

10. The method of claim 9, wherein desorption is carried out at a temperature in the range of 50° C. to 200° C.

11. The method of claim 9, wherein desorption is carried out at a temperature in the range of 80° C. to 150° C.

12. The method of claim 1, wherein absorption is carried out at a temperature in the range of 20° C. to 50° C., and the temperature of the absorption medium on entry into the absorber is below the phase-separation temperature.

13. The method of claim 12, wherein desorption is carried out at a temperature in the range of 50° C. to 200° C.

14. The method of claim 12, wherein desorption is carried out at a temperature in the range of 80° C. to 150° C.

* * * * *